United States Patent [19]

Calderazzo et al.

[11] Patent Number: 4,987,111
[45] Date of Patent: Jan. 22, 1991

[54] CATALYST COMPONENT AND CATALYST FOR THE POLYMERIZATION OF ETHYLENE AND THE COPOLYMERIZATION OF ETHYLENE WITH ALPHA-OLEFINS

[75] Inventors: Fausto Calderazzo, Ghezzano; Guido Pampaloni, Pontedera; Francesco Masi, San Donato Milanese; Angelo Moalli, Castelletto Ticino; Renzo Invernizzi, Milan, all of Italy

[73] Assignee: Enichem Anic, S.p.A., Palermo, Italy

[21] Appl. No.: 403,681

[22] Filed: Sep. 6, 1989

[30] Foreign Application Priority Data

Sep. 9, 1988 [IT] Italy ................ 21876 A/88

[51] Int. Cl.$^5$ ............................ C08F 4/646
[52] U.S. Cl. ................... 502/113; 502/154; 526/116
[58] Field of Search ................ 502/113, 154

[56] References Cited

U.S. PATENT DOCUMENTS

| | | | |
|---|---|---|---|
| 4,111,834 | 9/1978 | Caunt et al. | 502/113 X |
| 4,267,293 | 5/1981 | Fahey | 502/113 X |
| 4,325,839 | 4/1982 | McDaniel | 502/154 |
| 4,483,938 | 11/1984 | Rees | 502/113 |
| 4,525,551 | 6/1985 | Schmidt | 502/113 X |

*Primary Examiner*—Patrick P. Garvin
*Attorney, Agent, or Firm*—Hedman, Gibson, Costigan & Hoare

[57] ABSTRACT

A solid catalyst component for the polymerization of ethylene and the copolymerization of ethylene with $C_3$–$C_{10}$ alpha-olefins, contains titanium, vanadium and chlorine, is substantially definable by the formula (in atomic proportions):

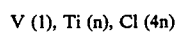

where n varies from 1 to 3, and is prepared by reacting titanium tetrachloride with a vanadium arene [V°(arene)$_2$] (arene=benzene or mono-, di- or tri-alkyl substituted benzene) in accordance with the equation:

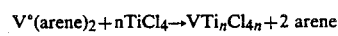

possibly followed by treatment with an alkyl aluminum chloride. This catalyst component, when associated with a trialkyl aluminium, is highly active in the production of ethylene polymers and copolymers by low temperature, low pressure methods in suspension, or by high temperature, high pressure methods conducted in a tubular reactor or pressure vessel, or by high temperature methods conducted in solution.

12 Claims, No Drawings

CATALYST COMPONENT AND CATALYST FOR THE POLYMERIZATION OF ETHYLENE AND THE COPOLYMERIZATION OF ETHYLENE WITH ALPHA-OLEFINS

This invention relates to a solid catalyst component and a catalyst for the polymerization of ethylene and the copolymerization of ethylene with $C_3$–$C_{10}$ alpha-olefins. The invention also relates to the use of said catalyst component and said catalyst in low pressure, low temperature suspension polymerization processes, in high pressure, high temperature processes conducted in a tubular reactor or pressure vessel, and in high temperature processes conducted in solution.

It is known in the art to polymerize ethylene or general alpha-olefins by the low-pressure Ziegler process. For this purpose catalysts are used generally formed from a compound of group IV to group VI elements of the periodic table (transition metal compounds), mixed with an organometallic compound or hydride of group I to group III elements of the periodic table, operating in solution, in suspension or in the gaseous phase. Catalysts are also known in which the transition metal is fixed to a solid organic or inorganic support which has possibly been physically and/or chemically treated.

The transition metal generally used for this purpose is titanium, which results in high yields and high productivity, especially in ethylene polymerization. Use is also made of combinations of titanium with other transition metals such as vanadium, zirconium of halfnium in the preparation of ethylene polymers or copolymers with specific characteristics. In particular, the titanium-vanadium combination is often used in the preparation of ethylene copolymers with homogenous distribution of the comonomer in the macromoloecule, which have good mechanical characteristics and improved workability. These catalyst components are generally obtained by bringing a titanium compound (generally titanium tetrachloride), a vanadium compound and an alkyl aluminium chloride (generally vanadium oxychloride) into contact under reaction conditions, as described for example in European patent application, publication No. 57,050. The main drawback of these catalyst components is their relatively low polymerization activity, with the result that costly purification of the polymer from the catalytic residues is required. A further drawback is the diffculty of reproducibly preparing catalysts having the desired characteristics. It is also known from U.S. Pat. Nos. 4,037,041 and 4,151,110 to prepare catalyst components from titanium tetrachloride and vanadium carbonyl as zerovalent vanadium compound. However even these catalyst components demonstrate poor activity under normal polymerization conditions, and in addition vanadium carbonyls are compounds which are difficult to produce and handle, making them unsuitable for use in a commercial plant.

A new catalyst component containing titanium and vanadian has now been found which is stable and highly active in ethylene (co)polymerization conducted at low or high pressure or in solution, and is able to produce ethylene (co)polymers having good mechanical and workability characteristics.

On this basis, according to a first aspect, the present invention provides a solid catalyst component in the form of particles of size between 5 and 20 μm, of surface area between 10 and 70 m²/g and of pore radius between 10,000 and 20,000 Å, and substantially definable by the formula (in atomic proportions):

$$V(1), Ti(n), Cl(4)$$

where n varies from 1 to 3 and is preferably about 2, which are prepared by reacting titanium tetrachloride with a vanadium arene [V.(arene)₂] in accordance with the following equation:

$$V.(arene)_2 + nTiCl_4 \rightarrow VTi_nCl_{4n} + 2\ arene$$

where arene=benzene or mono-, di- or tri-alkyl substituted benzene.

Examples of arenes are: benzene, toluene, p-xylene and mesitylene. Of these, benzene is preferred.

Vandium arenes are compounds known in the art and can be prepared as described for example by E. O. Fisher and H. S. Kogler in Chem. Ber. 90, 250 (1957), and by F. Calderazzo in Inorg. Chem. 3, 810 (1964).

According to the present invention the vanadium arene is dissolved in an inert liquid organic solvent, preferably an aliphatic hydrocarbon such as heptane, octane, nonane and decane, titanium tetrachloride then being added to the obtained solution in a quantity such that the Ti/V atomic ratio is within the range of 1/1 to 3/1 and preferably of the order of 2/1.

The procedure is carried out at a temperature of between 20° and 120° C., and preferably of the order of 90°–100° C., for a time of between a few seconds (for example 5–10 seconds) and 24 hours, with precipitation of the solid catalyst component. The short contact times are useful in the case of in-line feed to the polymerization reactor, in which the solid component precursors, in solution form in an organic solvent, are mixed together immediately before being fed to the reactor. Thus in one embodiment the solid catalyst component is produced and used directly in line in the form of a suspension in its mother liquor.

In a further embodiment the precipitated solid catalyst component is separated from the suspension by the usual methods such as filtration, decantation or centrifuging, and is washed with an inert liquid organic solvent, especially a hydrocarbon solvent such as heptane, operating at a temperature between ambient and the boiling point of the solvent used. The catalyst component obtained in this manner is a solid amorphous to X-rays, and in the form of particles of size between 5 and 20 μm, of apparent density between 0.2 and 0.35 g/ml, of surface area between 20 and 70 m²/g and of pore radius between 10,000 and 20,000 Å.

According to one embodiment of the present invention, the solid catalyst component prepared as described heretofore is treated with an alkyl aluminium chloride and preferably with diethyl aluminium monochloride, monoethyl aluminium dichloride or ethyl aluminium sesquichoride. This procedure is conveniently carried out with the solid catalyst component suspended in an inert liquid organic solvent, preferably an aliphatic hydrocarbon such as heptane, octane, nonane or decane, at a temperature of between 20° and 80° C. for a time depending on the chosen temperature and generally between 0.3 and 3 hours, and with an atomic ratio of aluminium in the alkyl aluminium chloride to titanium in the solid temperature component of between 1/1 and 5/1.

The preferred operating conditions are an atomic Al/Ti ratio of the order of 1/1–1.5/1, ambient temperature and a time of about one hour. The solid catalyst component treated in this manner is conveniently washed with an inert liquid organic solvent, especially an aliphatic hydrocarbon, operating under the aforesaid conditions. This treatment generally results in an increase in surface area and a reduction in average particle diameter and mean pore radius, these values however still falling within the aforesaid ranges, and produces a solid catalyst component generally having higher activity than the non-treated component.

The catalyst according to the present invention is formed from the described solid component plus a trialkyl aluminium containing from 2 to 8 and preferably from 2 to 4 carbon atoms in the alkyl portion. Triethyl aluminium and triisobutyl aluminium are preferred. Conveniently, in the catalyst of the present invention the atomic ratio of the aluminium (in the trialkyl aluminium) to the sum of the titanium and vanadium (in the solid catalyst component) varies from 2/1 to 50/1, the upper limit of said ratio not being critical but being dictated mainly by economic reasons. The preferred values of this ratio vary from 3/1 to 7/1, such values giving improved polymer yields. In addition, low ratios are advantageous in high temperature polymerization because they prevent the trialkyl aluminium becoming involved in reduction reactions with the production of species which are inactive for polymerization purposes.

The catalyst of the present invention is active in the polymerization of ethylene and the copolymerization of ethylene with $C_3$-$C_{10}$ alpha-olefins.

In particular, the catalyst is active within a wide range of conditions, and most particularly in the low temperature, low pressure processes normally used in the suspension method, in the high temperature, high pressure processes conducted in tubular reactors or pressure vessels, and in the high temperature processes conducted in solution. Processes in suspension are conducted generally in the presence of a diluent, at a temperature of between 60° and 100° C. and a pressure of between 5 and 15 atg, in the presence of hydrogen as moderator. High temperature, high pressure processes are conducted generally at a temperature of between 100° and 280° C. at a pressure of between 800 and 1800 atg. Processes in solution are conducted generally at a temperature of the order of 150°-300° C.

In ethylene homopolymerization, the catalysts of the present invention enable polymers to be obtained which have a molecular weight distribution ranging from medium to wide, and are particularly suitable for transformation by methods such as blow moulding in the manufacture of film and miscellaneous articles, and injection moulding. In the copolymerization of ethylene with alpha-olefins, in particular 1-butene and 1-hexene, the catalysts of the present invention enable low-density linear polymers to be obtained which are particularly suitable for transformation by blow moulding or injection moulding, depending on the molecular weight distribution. In all cases the catalysts of the present invention demonstrate a polymerization activity which is unexpectedly high considering the titanium and vanadium-based catalysts of the known art.

The experimental examples given hereinafter are provided to further illustrate the present invention. In the examples relating to the preparation of the solid catalyst component, the vanadium arene used is V.(benzene)$_2$, prepared by the aforesaid process of E. O. Fisher, H. S. Kogler and F. Calderazzo, as follows. 17.8 g (0.113 moles) of VCl$_3$, 9.6 g (0.36 moles) of powdered aluminium and 79.1 g (0.6 moles) of aluminium trichloride in 300 ml of benzene are heated under reflux for 18 hours in a three-neck 750 ml flask fitted with a stirrer, side cook and condenser connected to a mercury valve. The reaction mixture is diluted with 2.5 liters of benzene, and a cooled solution of 100 g of Na$_2$S$_2$O$_3$ in 1.25 liters of 30% w/w aqueous potassium hydroxide is then added slowly under strong stirring. The benzene phase is separated and dried. The residue is sublimed at 140°-160° C. and $10^{-2}$ torr. 6-7 g of V(benzene)$_2$ are obtained in the form of octahedral crystals of black-brown colour.

EXAMPLE 1

0.152 g of V.(benzene)$_2$ are dissolved in 100 ml of n-heptane operating in a 250 ml stirred reactor. 0.28 g of titanium tetrachloride are then added at a temperature of 25° C. (Ti/V atomic ratio=2/1). The suspension obtained is kept stirring for 24 hours at 25° C. The solid is then decanted and washed with three 100 ml portions of n-heptane. In this manner 0.3 g of solid catalyst component are obtained having the following characteristics:

titanium content: 22.9% by weight, expressed as metal,
specific surface area: 27 m$^2$/g,
apparent density: 0.28 g/ml,
mean pore radius: 15,000 Å,
average particle diameter: 12 μm.

The catalyst component contains 22.9% titanium, 13.0% vanadium and 64.1% chlorine w/w.

Expressing these components by their atomic proportions, the catalyst component can be represented by the formula:

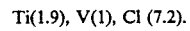

Ti(1.9), V(1), Cl (7.2).

EXAMPLE 2

0.152 g of V.(benzene)$_2$ are dissolved in 100 ml of n-heptane operating in a 250 ml stirred reactor fitted with a bulb condenser. 0.28 g of titanium tetrachloride are then added at a temperature of 25° C. (Ti/V atomic ratio=2/1). The suspension obtained is kept under reflux for 2 hours at the boiling point of heptane. 0.32 g of solid catalyst component are obtained having the following characteristics:

titanium content: 22.7% by weight,
specific surface area: 45 m$^2$/g
apparent density: 0.24 g/ml,
mean pore radius: 10,000 Å,
average particle diameter: 10 μm.

The catalyst component contains 22.7% titanium, 11.5% vanadium and 65.8% chlorine w/w.

Expressing these components by their atomic proportions, the catalyst component can be represented by the formula:

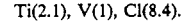

Ti(2.1), V(1), Cl(8.4).

EXAMPLE 3

0.3 g of the catalyst component obtained as described in Example 1 are suspended in 100 ml of n-heptane, operating in a 250 ml stirred reactor. 0.18 g of diethylaluminium monochloride are then added at a temperature of 25° C. (Al/Ti atomic ratio=1/1 ) The suspension is kept stirring for 2 hours at 25° C. The solid is then decanted and washed with three 100 ml portions of n-heptane. In this manner 0.3 g of solid catalyst component are obtained having the following characteristics:

titanium content: 21.4% by weight, expressed as metal,
specific surface area: 55 m²/g,
apparent density: 0.22 g/ml,
mean pore radius: 8,000 Å,
average particle diameter: 8 μm.

The catalyst component contains 21.4% titanium, 12.0% vanadium and 66.6% chlorine w/w.

Expressing these components by their atomic proportions, the catalyst component can be represented by the formula:

Ti(1.9), V(1), Cl(8).

EXAMPLE 4

0.3 g of the catalyst component obtained as described in Example 2 are suspended in 100 ml of n-heptane, operating in a 250 ml stirred reactor. 0.178 g of diethylaluminium monochloride are then added at a temperature of 25° C. (Al/Ti atomic ratio =1/1). Proceeding as in Example 3, 0.3 g of solid catalyst component are obtained having the following characteristics:

titanium content: 21.9% by weight, expressed as metal,
specific surface area: 70 m²/g,
apparent density: 0.19 g/ml,
mean pore radius: 5,000 Å,
average particle diameter: 6 μm.

The catalyst component contains 21.9% titanium, 11.6% vanadium and 66.4% chlorine w/w.

Expressing these components by their atomic proportions, the catalyst component can be represented by the formula:

Ti(2.0), V(1), Cl(8.2).

EXAMPLE 5

0.152 g of V.(benzene)$_2$ are dissolved in 100 ml of n-heptane operating in a 250 ml stirred reactor. 0.42 g of titanium tetrachloride are then added at a temperature of 25° C. (Ti/V atomic ratio=3/1). The suspension obtained is kept stirring for 24 hours at a temperature of 25° C. After decantation, the solid is washed with three 100 ml portions of n-heptane. In this manner 0.4 g of solid catalyst component are obtained having the following characteristics:

titanium content: 24.8% by weight, expressed as metal,
specific surface area: 32 m²/g,
apparent density: 0.26 g/ml,
mean pore radius: 13,000 Å,
average particle diameter: 11 μm.

The catalyst component contains 24.8% titanium, 8.5% vanadium and 66.7% chlorine w/w.

Expressing these components by their atomic proportions, the catalyst component can be represented by the formula:

Ti(3.1), V(1), Cl(11.3).

EXAMPLE 6 (comparison)

0.5 g of titanium tetrachloride and 0.23 g of vanadium oxychloride (VOCl$_3$) (Ti/V atomic ratio=2/1) are dissolved in 100 ml of n-heptane operating in a 250 ml stirred reactor. 0.3 g of diethyl aluminium monochloride are then added (Al/Ti atomic ratio=1/1), operating at a temperature of 25° C. The suspension obtained is kept stirring for 2 hours at 25° C. After decantation, the solid is washed with three 100 ml portions of n-heptane. In this manner 0.7 g of solid catalyst component are obtained having the following characteristics:

titanium content: 17.9% by weight, expressed as metal,
specific surface area: 20 m²/g,
apparent density: 0.32 g/ml,
mean pore radius: 18,000 Å,
average particle diameter: 14 μm.

The catalyst component contains 17.9% titanium, 9.5% vanadium and 72.6% chlorine w/w.

Expressing these components by their atomic proportions, the catalyst component can be represented by the formula:

Ti(2), V(1), Cl(11).

EXAMPLE 7 (comparison)

0.5 g of titanium tetrachloride and 1.82 g of vanadium oxychloride (Ti/V atomic ratio=2/1) are dissolved in 200 ml of n-heptane operating in a 500 ml stirred reactor. 0.63 g of diethyl aluminium monochloride are then added (Al/Ti atomic ratio=2/1) at a temperature of 25° C. The suspension obtained is kept stirring for 2 hours at 25° C. After decantation, the solid is washed with three 100 ml portions of n-heptane. In this manner 2.2 g of solid catalyst component are obtained having the following characteristics:

titanium content: 5.8% by weight, expressed as metal,
specific surface area: 36 m²/g,
apparent density: 0.28 g/ml,
mean pore radius: 14,000 Å,
average particle diameter: 14 μm.

The catalyst component contains 5.8% titanium, 23.9% vanadium and 70.3% chlorine w/w.

Expressing these components by their atomic proportions, the catalyst component can be represented by the formula:

Ti(1), V(3.9), Cl(16.5).

EXAMPLE 8

1900 ml of anhydrous n-heptane, 0.23 g of triethyl aluminium and 10.9 mg of the solid catalyst component prepared as described in Example 1 [Al/(Ti+V) atomic ratio=25] are introduced in that order into a 5 liter stirred reactor. The reactor temperature is raised to 90° C. and the reactor is then pressurized with hydrogen to 2 atg and then with ethylene to 6.5 atg, this pressure being maintained for 1 hour by continuously feeding ethylene. After this period the polymerization is interrupted by introducing into the reactor 20 ml of a 10% w/w alcoholic solution of ionol (2,6-di-t-butyl-p-cresol).

A polyethylene is recovered in accordance with the following values:

productivity: 9.2 kg, expressed as kg of polyethylene per gram of solid catalyst component,
yield: 40 kg, expressed as kg of polyethylene per gram of titanium in the solid catalyst component, yield: 75.5 kg, expressed as kg of polyethylene per gram of vanadium in the solid catalyst component.

The polyethylene produced in this manner has the following characteristics:
Melt index: 0.28 g/10 min (ASTM-D 1238 F),
Shear sensitivity: 12.8 (ASTM-D 1238 F),
Density: 0.955 g/ml (ASTM-D 2839),
Apparent density: 0.18 g/ml.

EXAMPLE 9

1900 ml of anhydrous n-heptane, 0.23 g of triethyl aluminum and 10.6 mg of the solid catalyst component prepared as described in Example 2 [Al/(Ti+V) atomic ratio=25] are introduced in that order into a 5 litre stirred reactor. The reactor temperature is raised to 90° C. and the reactor is then pressurized with hydrogen to 2 atg and then with ethylene to 6.5 atg. The procedure of Example 8 is followed polymerizing for 1 hour, to obtain polyethylene with:
productivity: 12.7 kg,
yield (with respect to the titanium): 56.0 kg,
yield (with respect to the vanadium): 105.0 kg.

The polyethylene obtained has the following characteristics:
Melt index: 0.25 g/10 min,
Shear sensitivity: 13.0,
Density: 0.955 g/ml,
Apparent density: 0.20 g/ml.

EXAMPLE 10

1900 ml of anhydrous n-heptane, 0.23 g of triethyl aluminium and 10.2 mg of the solid catalyst component prepared as described in Example 2 [Al/(Ti+V) atomic ratio=25 ] are introduced in that order into a 5 liter stirred reactor. The reactor temperature is raised to 90° C. and the reactor is then pressurized with hydrogen to 2 atg. 4 g of 1-butene are then fed in and pressurization continued with ethylene to 6.5 atg. The procedure of Example 8 is followed polymerizing for 1 hour, to obtain an ethylene/1-butene copolymer with:
productivity: 16.0 kg,
yeild (with respect to the titanium): 70 kg,
yield (with respect to the vanadium): 131.0 kg.

The copolymer produced in this manner has the following characteristics:
Melt index: 0.34 g/10 min,
Shear sensitivity: 12.4,
Density: 0.940 g/ml,
Apparent density: 0.15 g/ml.

EXAMPLE 11

1900 ml of anhydrous n-heptane, 0.23 g of triethyl aluminium and 10.4 mg of the solid catalyst component prepared as described in Example 2 [Al/(Ti+V) atomic ratio=25 ] are introduced in that order into a 5 liter stirred reactor. The reactor temperature is raised to 90° C. and the reactor is then pressurized with hydrogen to 2 atg. 10 g of 1-hexene are then fed in and pressurization continued with ethylene to 6.5 atg. The procedure of Example 8 is followed polymerizing for 1 hour, to obtain an ethylene/1-hexene copolymer with:
productivity: 15.0 kg,
yield (with respect to the titanium): 65.9 kg,
yield (with respect to the vanadium): 123.5 kg.

The copolymer produced in this manner has the following characteristics:
Melt index: 0.32 g/10 min,
Shear sensitivity: 12.5 ,
Density: 0.942 g/ml,
Apparent density: 0.16 g/ml.

EXAMPLE 12

1900 ml of anhydrous n-heptane, 0.23 g of triethyl aluminium and 10.6 mg of the solid catalyst component prepared as described in Example 3 [Al/(Ti+V) atomic ratio=25 ] are introduced in that order into a 5 liter stirred reactor. The reactor temperature is raised to 90° C. and the reactor is then pressurized with hydrogen to 2 atg and then with ethylene to 6.5 atg. The procedure of Example 8 is followed polymerizing for 1 hour, to obtain a polyethylene with:
productivity: 10.7 kg,
yield (with respect to the titanium): 50 kg,
yield (with respect to the vanadium): 94 kg.

The polyethylene produced in this manner has the following characteristics:
Melt index: 0.32 g/10 min,
Shear sensitivity: 12.8,
Density: 0.956 g/ml,
Apparent density: 0.22 g/ml.

EXAMPLE 13

1900 ml of anhydrous n-heptane, 0.23 g of triethyl aluminium and 10.1 mg of the solid catalyst component prepared as described in Example 4 [Al/(Ti+V) atomic ratio=25] are introduced in that order into a 5 liter stirred reactor. The reactor temperature is raised to 90° C. and the reactor is then pressurized with hydrogen to 2 atg and then with ethylene to 6.5 atg. The procedure of Example 8 is followed polymerizing for 1 hour, to obtain a polyethylene with:
productivity: 15.3 kg,
yield (with respect to the titanium): 70 kg,
yield (with respect to the vanadium): 132 kg.

The polyethylene produced in this manner has the following characteristics:
Melt index: 0.22 g/10 min,
Shear sensitivity: 13.4,
Density: 0.954 g/ml,
Apparent density: 0.22 g/ml.

EXAMPLE 14

1900 ml of anhydrous n-heptane, 0.23 g of triethyl aluminium and 10.0 mg of the solid catalyst component prepared as described in Example 5 [Al/(Ti+V) atomic ratio=25] are introduced in that order into a 5 liter stirred reactor. The reactor temperature is raised to 90° C. and the reactor is then pressurized with hydrogen to 2 atg and then with ethylene to 6.5 atg. The procedure of Example 8 is followed polymerizing for 1 hour, to obtain a polyethylene with:
productivity: 12.1 kg,
yield (with respect to the titanium): 50 kg,
yield (with respect to the vanadium): 143 kg.

The polyethylene produced in this manner has the following characteristics:
Melt index: 0.32 g/10 min,
Shear sensitivity: 12.8,
Density: 0.956 g/ml,
Apparent density: 0.24 g/ml

EXAMPLE 15

A steel reactor vessel with a volume of 1.5 liters fitted with a stirrer and heat transfer jacket for controlling the reaction temperature is used. A 20 kg/hour throughput of a mixture (50:50 w/w) of ethylene and 1-butene is fed into one end of the reactor by a reciprocating compressor. 80 ml/hour of a suspension in the form of a C10-C12 isoparaffin mixture containing 1.7 g/liter of the solid catalyst component prepared as described in Example 4 is fed into the same end of the reactor by an intensifier pump.

Triethyl aluminium in the form of a 10% w/w solution in a C10-C12 isoparaffin mixture is also fed into the end of the reactor by an intensifier pump in a quantity of 180 ml/hour so that the atomic ratio of the aluminium in said triethyl aluminium to the titanium in said solid catalyst component is 15/1.

Polymerization is conducted under the following conditions: reactor inlet pressure: 1200 atg, reactor inlet temperature: 60° C., polymerization temperature: 270° C., residence time in reactor: 2 minutes.

The reaction is conducted continuously, 10 ml/hour of glycerin being added to the reactor outlet stream to activate the catalyst. Operating under these conditions, the conversion calculated on the ethylene is 17.5%, the polymer being recovered by using a multistage flash chamber, the polymer being fed directly from said flash chamber to the extruder. The unaltered monomers are recycled to the reactor inlet after being purified and made up with fresh monomers. During an uninterrupted period of 120 hours an average of 3.5 kg/hour of an ethylene/1-butene copolymer are obtained with the following values:
productivity: 25.2 kg,
yield (with respect to the vanadium): 216.2 kg.
yield (with respect to the titanium): 117 kg,
The copolymer has the following characteristics:
Melt index: 1.1 g/10 min,
Shear sensitivity: 37,
Density: 0.9290 g/ml.

EXAMPLE 16 (comparison)

The procedure of Example 15 is followed, but using the solid catalyst component of Example 7. An ethylene/1-butene copolymer is obtained with the following values:
productivity: 11.6 kg,
yield (with respect to the vanadium): 48.3 kg.
yield (with respect to the titanium): 200 kg,
The copolymer has the following characteristics:
Melt index: 1.0 g/10 min,
Shear sensitivity: 39,
Density: 0.9290 g/ml.

EXAMPLE 17 (comparison)

1900 ml of anhydrous n-heptane, 0.23 g of triethyl aluminium and 14 mg of the solid catalyst component prepared as described in Example 6 [Al/(Ti+V) atomic ratio=25] are introduced in that order into a 5 liter stirred reactor. The reactor temperature is raised to 90° C. and the reactor is then pressurized with hydrogen to 2.0 atg and then with ethylene to 6.5 atg. The procedure of Example 8 is followed polymerizing for 1 hour, to obtain a polyethylene with:
productivity: 4.2 kg,
yield (with respect to the titanium): 23.5 kg,
yield (with respect to the vanadium): 44 kg.
The polyethylene produced in this manner has the following characteristics:
Melt index: 0.44 g/10 min,
Shear sensitivity: 12.0,
Density: 0.955 g/ml,
Apparent density: 0.27 g/ml.

EXAMPLE 18

1900 ml of anhydrous n-heptane, 0.116 g of triethyl aluminium and 10.9 mg of the solid catalyst component prepared as described in Example 1 [Al/(Ti+V) molar ratio=12.6] are introduced in that order into a 5 liter stirred reactor. The reactor temperature is raised to 90° C. and the reactor is then pressurized with hydrogen to 2 atg and then with ethylene to 6.5 atg. The procedure of Example 8 is followed polymerizing for 1 hour, to obtain polyethylene with:
productivity: 17.9 kg,
yield (with respect to the vanadium): 152 kg.
yield (with respect to the titanium): 80 kg,
The polyethylene produced in this manner has the following characteristics:
Melt index: 0.24 g/10 min,
Shear sensitivity: 12.0,
Density: 0.956 g/ml,
Apparent density: 0.18 g/ml.

EXAMPLE 19

1900 ml of anhydrous n-heptane, 0.06 g of triethyl aluminium and 10.9 mg of the solid catalyst component prepared as described in Example 1 [Al/(Ti+V) molar ratio=6.4] are introduced in that order into a 5 liter stirred reactor. The reactor temperature is raised to 90° C. and the reactor is then pressurized with hydrogen to 2 atg and then with ethylene to 6.5 atg. The procedure of Example 8 is followed polymerizing for 1 hour, to obtain polyethylene with:
productivity: 35.4 kg,
yield (with respect to the vanadium): 297 kg.
yield (with respect to the titanium): 158 kg,
The polyethylene produced in this manner has the following characteristics:
Melt index: 0.4 g/10 min,
Shear sensitivity: 48,
Density: 0.959 g/ml,
Apparent density: 0.20 g/ml.

EXAMPLE 20

1900 ml of anhydrous n-heptane, 0.038 g of triethyl aluminium and 10.9 mg of the solid catalyst component prepared as described in Example 1 [Al/(Ti+V) molar ratio=4] are introduced in that order into a 5 liter stirred reactor. The reactor temperature is raised to 90° C. and the reactor is then pressurized with hydrogen to 2 atg and then with ethylene to 6.5 atg. The procedure of Example 8 is followed polymerizing for 1 hour, to obtain polyethylene with: productivity: 40 kg,
yield (with respect to the vanadium): 335 kg.
yield (with respect to the titanium): 178.5 kg,
The polyethylene produced in this manner has the following characteristics:
Melt index: 0.35 g/10 min,
Shear sensitivity: 48,
Density: 0.958 g/ml,
Apparent density: 0.2 g/ml.

EXAMPLE 21

1900 ml of anhydrous n-heptane, 0.35 g of triethyl aluminium and 10.9 mg of the solid catalyst component prepared as described in Example 1 [Al/(Ti+V) molar ratio=38] are introduced in that order into a 5 liter stirred reactor. The reactor temperature is raised to 90° C. and the reactor is then pressurized with hydrogen to 2 atg and then with ethylene to 6.5 atg. The procedure of Example 8 is followed polymerizing for 1 hour, to obtain polyethylene with:
productivity: 8.7 kg,
yield (with respect to the vanadium): 73 kg.
yield (with respect to the titanium): 38.8 kg,
The polyethylene produced in this manner has the following characteristics:
Melt index: 0.21 g/10 min,
Shear sensitivity: 13,
Density: 0.955 g/ml,
Apparent density: 0.17 g/ml.

EXAMPLE 22

1900 ml of anhydrous n-heptane and 0.23 g of triethyl aluminium are fed in that order into a 5 liter pressure vessel. The solution is heated to 90° C. and the vessel pressurized with 2 atg of hydrogen.

2 ml of a heptane solution containing 0.364 g of V(mesitylene)$_2$ and 2 ml of a heptane solution containing 0.475 g of titanium tetrachloride are fed under an inert atmosphere into a 20 ml dispenser containing 10 ml of anhydrous n-heptane, so simulating the in-line formation of the solid catalyst component (atomic Ti/V ratio=2) used in the preceding examples. The catalyst component suspension thus formed is immediately fed into the polymerization reactor by the pressure of ethylene, which is fed to a pressure of 6.5 atg [Al/(Ti+V) atomic ratio=25]. The pressure is kept at 6.5 atg by feeding ethylene for 1 hour.

Polymerization is interrupted as in the preceding examples, to recover a polyethylene with:
productivity: 7 kg,
yield (with respect to the vanadium): 58.6 kg.
yield (with respect to the titanium): 31.2 kg,
The polyethylene produced in this manner has the following characteristics:
Melt index: 0.23 g/10 min,
Shear sensitivity: 13,
Density: 0.955 g/ml,
Apparent density: 0.22 g/ml.

EXAMPLE 23

1900 ml of anhydrous n-heptane and 0.06 g of triethyl aluminium are fed in that order into a 5 liter pressure vessel. The solution is heated to 90° C. and the vessel pressurized with 2 atg of hydrogen.

2 ml of a heptane solution containing 0.364 g of V(mesitylene)$_2$ and 2 ml of a heptane solution containing 0.475 g of titanium tetrachloride are fed under an inert atmosphere into a 20 ml dispenser containing 10 ml of anhydrous n-heptane, so simulating the in-line formation of the solid catalyst component (atomic Ti/V ratio=2) used in the preceding examples. The catalyst component suspension thus formed is immediately fed into the polymerization reactor by the pressure of ethylene, which is fed until the pressure in the vessel is 6.5 atg [Al/(V+Ti) atomic ratio=6,4]. The process is continued for 1 hour, to recover a polyethylene with:
productivity: 31.6 kg,
yield (with respect to the vanadium): 264 kg.
yield (with respect to the titanium): 141 kg,
The polyethylene produced in this manner has the following characteristics:
Melt index: 0.24 g/10 min,
Shear sensitivity: 46,
Density: 0.9585 g/ml,
Apparent density: 0.20 g/ml.

We claim:

1. A solid catalyst component for the polymerization of ethylene and the copolymerization of ethylene with $C_3$–$C_{10}$ alpha-olefins, having the formula $$VTi_nCl_{4n}$$

wherein n varies from 1 to 3, said catalyst component prepared by a reaction of titanium tetrachloride with a vanadium arene (V°(arene)$_2$) in accordance with the equation:

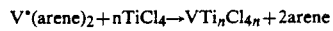

$$V°(arene)_2 + nTiCl_4 \rightarrow VTi_nCl_{4n} + 2arene$$

wherein said arene is selected from unsubstituted benzene or benzene substituted with 1–3 alkyl groups, and having a particle size of from 5 to 20 μm, said particles having a surface area of from 10 to 70 m$^2$/g and a mean pore radius of from 10,000 to 20,000 Angstroms.

2. The catalyst component of claim 1, wherein the arene is selected from benzene, toluene, p-xylene and mesitylene.

3. The catalyst component of claim 2, wherein the arene is benzene, and n has a value of about 2.

4. The catalyst component of claim 1, wherein there is a Ti/V atomic ratio of from 1/1 to 3/1, and the reaction is conducted in an inert liquid organic solvent at a temperature of from 20° to 120° C. for from 5 seconds to 24 hours.

5. The catalyst component of claim 4, wherein the inert, liquid organic solvent is selected from aliphatic hydrocarbons.

6. The catalyst component of claim 4, wherein the Ti/V atomic ratio is about 2/1, and the reaction is conducted at a temperature of from 90° to 100° C.

7. The catalyst component of claim 1, further comprising treating the catalyst component with an alkyl aluminum chloride, wherein there is an Al/Ti atomic ratio of from 1/1 to 5/1, and the reaction is conducted in an inert liquid organic solvent at a temperature of from 20° to 80° C. for from 30 minutes to 3 hours.

8. The catalyst component of claim 7, wherein the alkyl aluminum chloride is selected from diethyl aluminum monochloride, monoethyl aluminum dichloride and ethyl aluminum sesquichloride, and the Al/Ti atomic ratio is from 1/1 to 1.5/1 and the reaction is conducted at ambient temperatures for about 1 hour.

9. The catalyst component of claim 1, further comprising a trialkyl aluminum containing an alkyl group having from 2 to 8 carbon atoms and having an Al/(Ti+V) atomic ratio of from 2/1 to 50/1.

10. The catalyst component of claim 9, wherein the Al/(Ti+V) atomic ratio is from 3/1 to 7/1.

11. The catalyst component of claim 9, wherein the trialkyl aluminum contains an alkyl group having from 2 to 4 carbon atoms.

12. The catalyst component of claim 11, wherein the trialkyl aluminum is selected from triethyl aluminum and triisobutyl aluminum.

* * * * *